Jan. 28, 1964        W. C. BORGESON ETAL        3,119,578
BALLOON DEFLATION APPARATUS
Filed Sept. 9, 1960
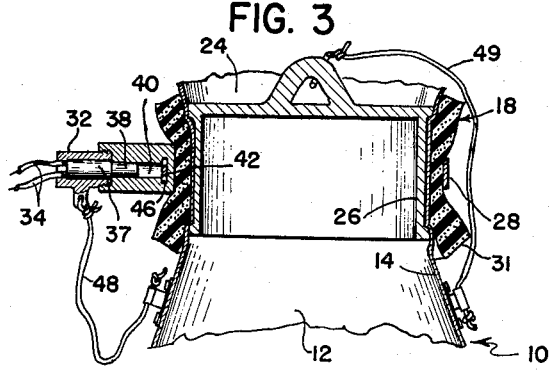
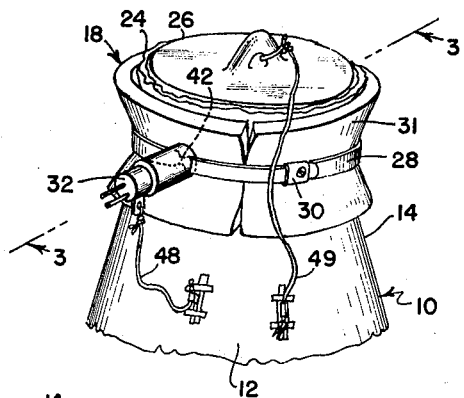
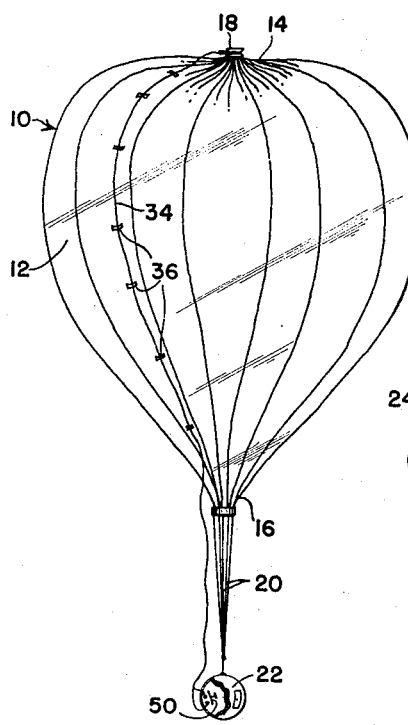
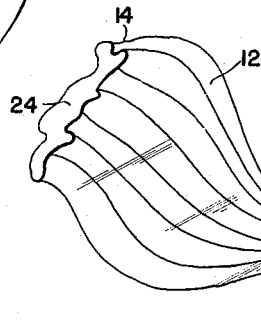
*INVENTORS*
WESLEY C. BORGESON
THOMAS M. OLSON
BY
*James V. Harmon*
AGENT

United States Patent Office 3,119,578
Patented Jan. 28, 1964

3,119,578
BALLOON DEFLATION APPARATUS
Wesley C. Borgeson, Minneapolis, and Thomas M. Olson, St. Paul, Minn., assignors, by mesne assignments, to Litton Systems, Inc., Beverly Hills, Calif., a corporation of Maryland
Filed Sept. 9, 1960, Ser. No. 54,944
6 Claims. (Cl. 244—31)

This invention relates to balloons and airships and more particularly to rapid deflation devices for balloons which may be used to prevent damage to the pay load when it is desired to terminate a balloon flight.

When a balloon flight is terminated, the balloon should not simply be cut from its pay load and released, because if the balloon were allowed to float away from the landing site, it could constitute a menace to air traffic. Therefore, it is important to keep the balloon attached to the pay load, such as a container or gondola for instruments or personnel. If, however, such an attached balloon remains partially inflated when the balloon flight is terminated, surface winds may drag the balloon and its pay load or flight train across the ground, thus injuring equipment or personnel. It is therefore also desirable that the balloon be rapidly deflated, so it will fall to the ground without such dragging.

In the past, various types of rip devices have been used to deflate balloons. These devices ordinarily consisted of a cord attached to a side wall of the balloon envelope and extending from the envelope to a gondola suspended beneath the balloon. When it was desired to deflate the balloon, the cord was pulled manually, thus ripping a portion out of the side of the balloon. Malfunctions of such previous systems have occurred and the reliability of a rip cord system may not meet the desired standard. Occasionally, for example, the cord will merely tear out a small section of the side wall of the balloon, leaving a hole of insufficient size to release the gas in the envelope as rapidly as desired. Or the pulling of the rip cord may sometimes fail to tear the balloon at all, and merely lower the side of the balloon to which the cord is attached, thereby shifting the remaining bubble of lifting gas within the balloon to the other side instead of releasing the gas.

It is thus one object of the present invention to provide an improved rapid deflation device for balloons and the like which has better reliability than previous devices.

It is another object of the present invention to provide a balloon deflation apparatus which has improved speed of action.

It is still another object of the present invention to provide a balloon deflation apparatus which, when operated, provides a relatively large opening in the top of the balloon for the release of lifting gas.

It is a still further object of the present invention to provide an improved balloon deflation apparatus for balloons of the type in which the balloon envelope includes a cylindrical or tailored tubular body portion having its upper end closed by gathering the material of the body and securing it in a suitable end fitting.

Briefly stated, the present invention includes a balloon having a balloon envelope adapted to contain a lifting gas therein, and a rapid deflation closure assembly for the balloon for rapidly releasing lifting gas therefrom. The rapid deflation closure assembly in turn comprises the combination of a closure member such as a securing or fastening element adapted to hold the edges of a relatively large opening in the upper body of the balloon in closed condition, and an opening or releasing means operatively connected for quickly releasing or disassembling said securing or fastening member. Preferably the invention also includes a control means operatively connected to said opening means which allows operation of said opening means from a position remote from said closure. Operation of the control means is adapted to cause the rapid deflation closure assembly to open and thus allow lifting gas to pass out through the relatively large opening thus formed. Specifically, the foregoing objects are accomplished by providing electrically operated explosive means for rapid release or disassembly of an improved end fitting which, prior to such release, holds together the gathered edges of a large opening at the top portion of a cylindrical or tailored balloon body.

The invention will be best understood by reference to the following illustration and accompanying drawings wherein:

FIG. 1 is a side elevation of a balloon embodying the present invention.

FIG. 2 is a perspective view of the rapid deflation device according to the present invention.

FIG. 3 is a sectional view taken along line 3—3 of FIG. 2.

FIG. 4 is a perspective view showing the release of gas from the balloon of FIG. 1 after the rapid deflation device has been opened.

Referring now to the drawings, there is shown a balloon 10 adapted to contain lifting gas and including a balloon envelope 12 formed from flexible sheet material such as polyethylene film. Balloon envelope 12 is illustrated as a cylindrical or tailored balloon of the general types described in Kizzek United States Patent 2,779,554 and Froehlich Patent 2,880,946. The balloon 10 includes a top portion 14 and a bottom portion 16. Such top and bottom portions normally include relatively large openings (see FIG. 4), which are usually closed by end fittings or closure members of the types described in said patents. Connected to the bottom portion 16 of balloon 10 are a plurality of harness cables 20 and suspended therefrom a load 22 such as a manned gondola.

In this case, however, the upper portion 14 of the balloon 10 is closed by an improved closure assembly or rapid deflation device 18 according to a preferred embodiment of the present invention. This improved deflation device or closure assembly is adapted to provide quickly, when needed, the relatively large opening 24 (best seen in FIG. 4) through which lifting gas can pass out of the top of the balloon when the rapid deflation device is opened.

The preferred rapid deflation device according to the present invention includes an improved end fitting having an inner closure element 26 and an outer closure element or strap-like fastener 28 which is used to hold the assembly together and thus secure the gathered edges of opening 24 in their normal closed position around the side walls of the inner closure element 26. The ends of fastener 28 may be secured together by means of any suitable clamp such as clamp 30.

During assembly of the balloon and the rapid deflation device or closure, the edges of opening 24 are gathered or pursed together, thereby forming a large number of folds in the edge thereof around the closure element 26. The folds formed in the edges of the opening 24 are secured tightly in relation to the closure element 26 by fastener 28. To aid in holding the assembly and preventing the release of lifting gas through the rapid deflation closure, we prefer to place separable outer closure members, such as foam rubber sheets 31, between fastener 28 and the gathered edges of opening 24.

Operatively connected to the side of closure fastener 28 is provided a suitable opener 32. The opener 32 according to the preferred embodiment, opens closure 18 by rupturing a frangible portion 42 of fastener 28. While a number of opening means may be used for thus actuating the rapid deflation apparatus, we prefer an electrically operated opener in combination with a suitable control means such as conductors 34 which allow operation of the opening means from a remote vantage point. Conductors 34 may be secured to the balloon envelope 12 by means of tapes 36 and led to the gondola or pay load for this purpose.

The energy for opening the rapid deflation closure is preferably supplied by an electrically detonated explosive squib 37 of known construction. When the squib 37 is detonated by current through conductors 34, the explosion sends the squib projectile 38 through barrel 40, thereby rupturing the frangible portion 42 of fastener 28. The opener 32 may be conveniently supported in operative association with the fastener 28 by passing the fastener 28 through a suitable slot 46 extending transversely through the end of opener 32 opposite from the explosive squib 37. To prevent the opener 32 or other parts of the closure assembly from falling away from the balloon after the rapid deflation device has been opened, suitable means are provided for attaching such parts separately to the balloon envelope. Thus the opener 32 may be attached to the envelope 12 by means of a suitable cord 48 attached at one end to the opener 32 and at the other end to a suitable patch on the envelope 12. Similarly, the inner closure member 26 may be attached by a cord 49 to the balloon body.

From the foregoing description, it can be seen that the present invention provides an improved closure assembly and deflation device which will operate very rapidly and with good reliability. The invention allows the deflation apparatus to be opened very quickly regardless of the amount of slack in the harness cables or envelope. It provides a relatively large opening, so that quick release of gas is assured. Moreover, the use of the normal top opening 24 which is available in the top central portion of cylindrical and tailored balloons makes it unnecessary to add to or weaken the remaining body portion of the balloon, and that the opportunity for the lifting gas to become trapped in the upper portion of the balloon is obviated. It is apparent that the present invention is equally adapted to use in manned and unmanned balloon flights, since the control switch 50 (illustrated schematically in gondola 22 of FIG. 1) for energizing opener 32 may be operated manually, if desired, or by a battery powered timer, or automatically in response to impact of the load 22 against the ground.

In view of the principles set forth herein, we have shown some of the ways of carrying out the present invention and some of the equivalents which are suggested by these disclosures.

Now, therefore, we claim:

1. A deflation apparatus for a balloon including a gas impervious balloon envelope formed from flexible sheet material and having a relatively large opening therein comprising encircling means for normally preventing passage of lifting gas through said opening, said means including a fastener the opening for pursing together the edges of said opening to form a reopenable closure communicating with said balloon envelope and for securing together folds formed about the edges of said opening to prevent the escape of lifting gas from the interior of said balloon envelope, an opener operatively associated with said fastener for releasing said fastener, and control means operatively connected to said opener for actuating said opener from a remote vantage point, the actuation of said opener releasing said fastener and causing the opening in the balloon to open, thereby allowing rapid release of lifting gas from said balloon envelope through said opening.

2. A balloon having an envelope adapted to contain a lifting gas, said envelope having a deflation opening communicating therewith, said opening having a relatively large cross sectional area, a closure element in said opening, said closure element normally preventing the passage of lifting gas out of said envelope, a frangible fastener connected to said envelope to secure the edges of said opening to said closure element, opening means connected to said closure adapted to rupture a portion of said frangible element, control means connected to said opener to actuate said opening means, said closure element being adapted to fall from said opening when said portion of said frangible element is ruptured, whereby lifting gas is rapidly released through said opening.

3. A balloon having means for rapidly releasing lifting gas therefrom comprising in combination, a balloon envelope adapted to contain a lifting gas therein, said balloon envelope having top and bottom portions, an opening in the top portion of said envelope, harness cables suspended from said balloon, a load suspended from said harness cables and disposed below said bottom portion, a rapid deflation closure for said balloon envelope disposed in said top portion, said rapid deflation closure normally preventing the release of lifting gas from said balloon through said opening, said rapid deflation closure including a fastening element secured to said envelope to maintain said envelope gas tight and prevent passage of gas through the opening, opening means connected to said rapid deflation closure for separating said fastening element from said envelope, and control means operatively connected to said opening means to release said fastening means thereby opening said rapid deflation closure, the operation of said control means causing said rapid deflation closure to open and allowing said lifting gas to pass out through the opening in the top portion of said balloon envelope.

4. A balloon having means for rapidly releasing lifting gas therefrom comprising in combination a balloon envelope adapted to contain a lifting gas, said envelope having an opening therein, a rapid deflation closure for said balloon envelope comprising a closure element disposed in said opening, a frangible fastener securing said enveloped to said closure element, said frangible fastener and closure element normally preventing release of lifting gas from said balloon envelope, an opener connected to said frangible fastener, said opener comprising an explosive charge and a projectile operatively associated with said explosive charge, said projectile being adapted to rupture said frangible fastener when said explosive is detonated and electric control means connected to said explosive and extending to a remote vantage point to detonate said explosive, the detonation of said explosive charge causing said closure to open thereby allowing rapid release of said lifting gas.

5. A balloon having an envelope adapted to contain a lifting gas therein, an opening in said envelope, an outer closure element for said envelope normally preventing the release of gas from said envelope through said opening, an explosive member operatively connected to said closure element to open said closure element when said explosive member is detonated, control means operatively connected to said explosive to detonate said explosive member, said control means being operable from a remote vantage point, the detonation of said explosive member causing said closure element to be severed thereby opening the envelope and allowing rapid release of said lifting gas from said envelope.

6. A balloon having a balloon envelope adapted to contain a lifting gas therein, an opening in said envelope, a rapid deflation device connected to said balloon comprising a closure fastener communicating with the opening in said envelope to normally prevent the escape of lifting gas from said envelope through said opening, an electrically controlled opener connected to said closure fastener, said electrically controlled opener being adapted to open said closure fastener, means for actuating said electrically controlled opener including conductors connected to said electrically controlled opener and extending away from said electrically controlled opener to a remote vantage point, said conductors being adapted to supply current to said electrically controlled opener from a power source, the passage of current through said conductors causing said closure fastener to be severed thereby allowing rapid release of said lifting gas from said balloon envelope through the opening.

References Cited in the file of this patent

UNITED STATES PATENTS

| | | |
|---|---|---|
| 2,455,248 | Hagen et al. | Nov. 30, 1948 |
| 2,474,826 | Cantlin | July 5, 1949 |
| 2,924,147 | Bohl et al. | Feb. 9, 1960 |

FOREIGN PATENTS

| | | |
|---|---|---|
| 11,301 | Great Britain | of 1884 |
| 261 | Great Britain | of 1893 |
| 344,591 | Germany | Nov. 25, 1921 |